US008612502B2

(12) United States Patent
Budianu et al.

(10) Patent No.: US 8,612,502 B2
(45) Date of Patent: Dec. 17, 2013

(54) SIMPLIFIED EQUALIZATION FOR CORRELATED CHANNELS IN OFDMA

(75) Inventors: Petru Cristian Budianu, San Diego, CA (US); Hermanth Sampath, San Diego, CA (US); Alexei Gorokhov, San Diego, CA (US); Dhananjay A. Gore, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 992 days.

(21) Appl. No.: 12/052,248

(22) Filed: Mar. 20, 2008

(65) Prior Publication Data
US 2008/0235311 A1 Sep. 25, 2008

Related U.S. Application Data

(60) Provisional application No. 60/896,038, filed on Mar. 21, 2007.

(51) Int. Cl.
*G06F 7/38* (2006.01)

(52) U.S. Cl.
USPC ............................ 708/290; 708/323; 708/514

(58) Field of Classification Search
None
See application file for complete search history.

(56) References Cited

U.S. PATENT DOCUMENTS

| | | | | |
|---|---|---|---|---|
| 5,448,590 A * | 9/1995 | Kostic | | 375/232 |
| 5,488,635 A * | 1/1996 | Chennakeshu et al. | | 375/340 |
| 5,598,432 A * | 1/1997 | Wei | | 375/229 |
| 6,122,320 A * | 9/2000 | Bellifemine et al. | | 375/240 |
| 6,904,088 B1 * | 6/2005 | Brecher et al. | | 375/233 |
| 6,954,421 B2 | 10/2005 | Kuwabara et al. | | |
| 6,954,509 B2 * | 10/2005 | Yang et al. | | 375/350 |
| 7,433,433 B2 | 10/2008 | Wilhelmsson et al. | | |
| 2004/0240572 A1 | 12/2004 | Brutel et al. | | |
| 2005/0058234 A1 * | 3/2005 | Stojanovic | | 375/371 |
| 2005/0135509 A1 | 6/2005 | Mantravadi et al. | | |
| 2006/0039460 A1 * | 2/2006 | Fimoff et al. | | 375/233 |
| 2006/0085497 A1 * | 4/2006 | Sehitoglu | | 708/405 |
| 2006/0251198 A1 * | 11/2006 | Ma et al. | | 375/350 |

FOREIGN PATENT DOCUMENTS

| | | |
|---|---|---|
| EP | 1703686 | 9/2006 |
| JP | 2001196982 A | 7/2001 |
| JP | 2004519898 A | 7/2004 |
| JP | 2007221317 A | 8/2007 |

(Continued)

OTHER PUBLICATIONS

International Search Report, PCT/US08/057864, International Search Authority, European Patent Office, Oct. 27, 2008.

(Continued)

*Primary Examiner* — Michael D Yaary
(74) *Attorney, Agent, or Firm* — Donald C. Kordich

(57) ABSTRACT

Systems and methodologies are described that facilitate equalization of received signals in a wireless communication environment. Multiple transmit and/or receive antennas and utilize MIMO technology to enhance performance. A single tile of transmitted data, including a set of modulation symbols, can be received at multiple receive antennas, resulting in multiple tiles of received modulation symbols. Corresponding modulation symbols from multiple received tiles can be processed as a function of channel and interference estimates to generate a single equalized modulation symbol. Typically, the equalization process is computationally expensive. However, the channels are highly correlated. This correlation is reflected in the channel estimates and can be utilized to reduce complex equalization operations. In particular, a subset of the equalizers can be generated based upon the equalizer function and the remainder can be generated using interpolation. In addition, the equalizer function itself can be simplified.

26 Claims, 12 Drawing Sheets

(56) References Cited

FOREIGN PATENT DOCUMENTS

| JP | 2008160822 A | 7/2008 |
|---|---|---|
| KR | 20010086801 A | 9/2001 |
| WO | WO2004095730 A1 | 11/2004 |
| WO | 2005117377 | 12/2005 |
| WO | 2006050627 | 5/2006 |
| WO | WO2006092877 A1 | 9/2006 |
| WO | WO2006129750 A1 | 12/2006 |

OTHER PUBLICATIONS

Written Opinion, PCT/US08/057864, International Search Authority, European Patent Office, Oct. 27, 2008.

Borgmann et al., "Interpolation-Based Efficient Matrix Inversion for MIMO-OFDM Receivers," Signals, Systems and Computers, 2004, Conference Record of the Thirty-Eighth ASILOMAR Conference on Pacific Grove, CA, USA, Nov. 7-10, 2004, pp. 1941-1947, vol. 2, IEEE, Piscataway, NJ, USA, XP010781386.

Jingming Wang et al ,"Performance of linear interpolation-based MIMO detection for MIMO-OFDM systems" Wireless Communications and Networking Conference, 2004. WCNC. 2004 IE EE Atlanta, GA, USA Mar. 21-25, 2004, Piscataway, NJ, USA,IEEE— ISBN 978-0-7803-8344-9 ; ISBN 0-7803-8344-3 vol. 2, pp. 981-986 .XP010708264.

Chin F P S et al.; "An Improved Square-Root Algorithm for BLAST" IEEE Signal Processing Letters, vol. 11, No. 9, Sep. 2004 , pp. 772-775, Piscataway, NJ, USA. ISSN: 1070-9908.

\* cited by examiner

SIMPLIFIED EQUALIZATION FOR CORRELATED CHANNELS IN OFDMA

CLAIM OF PRIORITY UNDER 35 U.S.C. §119

This application claims priority to U.S. Provisional Patent Application Ser. No. 60/986,038 entitled "SIMPLIFIED EQUALIZATION FOR CORRELATED CHANNELS IN OFDMA," which was filed Mar. 21, 2007. The entirety of the aforementioned application is herein incorporated by reference.

BACKGROUND

I. Field

The following description relates generally to wireless communications, and, amongst other things, to facilitation of equalization.

II. Background

Wireless networking systems have become a prevalent means by which a majority of people worldwide has come to communicate. Wireless communication devices have become smaller and more powerful in order to meet consumer needs and to improve portability and convenience. Consumers have become dependent upon wireless communication devices such as cellular telephones, personal digital assistants (PDAs) and the like, demanding reliable service, expanded areas of coverage and increased functionality.

Generally, a wireless multiple-access communication system may simultaneously support communication for multiple wireless terminals or user devices. Each terminal communicates with one or more access points via transmissions on the forward and reverse links. The forward link (or downlink) refers to the communication link from the access points to the terminals, and the reverse link (or uplink) refers to the communication link from the terminals to the access points.

Wireless systems may be multiple-access systems capable of supporting communication with multiple users by sharing the available system resources (e.g., bandwidth and transmit power). Examples of such multiple-access systems orthogonal frequency division multiple access (OFDMA) systems. Typically, each access point supports terminals located within a specific coverage area referred to as a sector. The term "sector" can refer to an access point and/or an area covered by an access point, depending upon context. Terminals within a sector can be allocated specific resources (e.g., time and frequency) to allow simultaneous support of multiple terminals.

Terminals and access points can utilize multiple transmit and/or receive antennas, referred to as multiple-input multiple output (MIMO). There is significant interest in MIMO technology and possible increases in bandwidth in wireless systems utilizing MIMO. MIMO is designed to provide for increases in data throughput as well as range.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with facilitating equalization. Access points and terminals can include multiple transmit and/or receive antennas and utilize MIMO technology to enhance performance. Data can be processed as a series of tiles, where a tile is a time-frequency region that includes a predetermined number of successive tones placed in a number of successive OFDM symbols. A single tile of transmitted data, including a set of modulation symbols, can be received by multiple receive antennas, resulting in multiple tiles of received modulation symbols. Corresponding modulation symbols from multiple received tiles can be processed as a function of channel and interference estimates to generate a single equalized modulation symbol. Typically, the equalization process is computationally expensive. In general, a separate equalizer matrix is computed for each modulation symbol within a tile as a function of channel and interference estimates. This equalizer matrix is used to generate an equalized modulation symbol from corresponding received modulation symbols. However, the channels are highly correlated. This correlation is reflected in the channel estimates and can be utilized to reduce complexity of equalization operations. In particular, an equalizer matrix can be generated for each of a subset of the modulation symbols within a tile. The equalizer matrices for the remainder of modulation symbols of the tile can be generated using interpolation. In other aspects, calculation of equalizer matrices can be simplified. For example, an equalizer function that utilizes an inverse matrix operation can be simplified by substituting a Taylor approximation for the inverse operation.

In an aspect, the present disclosure provides a method for facilitating equalization, which comprises generating an equalizer matrix for each element of a subset of a set of modulation symbols, wherein channel estimates associated with the set of modulation symbols are correlated. The method also comprises generating an interpolated equalizer matrix for each element of the set of modulation symbols not included in the subset utilizing interpolation of the equalizer matrices. In addition, the method comprises equalizing the set of modulation symbols as a function of the equalizer matrices and the interpolated equalizer matrices.

In another aspect, the present disclosure provides an apparatus that facilitates equalization. The apparatus comprises a processor that executes instructions for an computing equalizer matrix for a first modulation symbol of a set of modulation symbols, computing an interpolated equalizer matrix for a second modulation symbol of the set of modulation symbols based at least in part upon interpolation from the first equalizer matrix, and computing equalized modulation symbols for the set of modulation symbols utilizing the equalizer matrix and the interpolated equalizer matrix. The apparatus also comprises a memory coupled to the processor.

According to yet another aspect, the present disclosure provides an apparatus that facilitates equalization, which comprises means for generating equalizer matrices for a subset of a set of modulation symbols based at least in part upon an equalizer function, wherein channels associated with the set of modulation symbols are correlated. The apparatus also comprises means for generating matrices for the set of modulation symbols not included within the subset using interpolation. Additionally, apparatus comprises means for computing a set of equalized modulation symbols corresponding to the set of modulation symbols utilizing the equalizer matrices and the interpolated matrices.

According to a further aspect, the present disclosure provides a computer-readable medium having instruction for calculating equalizer matrices for a subset of a set of modulation symbols based at least in part upon an equalizer function, wherein channels associated with the set of modulation symbols are correlated. In addition, the medium includes instructions for calculating interpolated matrices for the set of modulation symbols not included within the subset based upon interpolation of the equalizer matrices and equalizing the set of modulation symbols as a function of the equalizer matrices and the interpolated matrices.

According to another aspect, the present disclosure provides a processor that executes computer-executable instructions that facilitate equalization. The instructions comprise generating a first set of equalizer matrices for a subset of a set of modulation symbols, wherein channel estimates associated with the set of modulation symbols are correlated. The instructions also comprise generating a second set of equalizer matrices for the set of modulation symbols not included in the subset based at least in part upon interpolating the first set of equalizer matrices and computing equalized modulation symbols for the set of modulation symbols based at least in part upon the first and second sets of equalizer matrices.

In another aspect, the present disclosure provides a method that facilitates equalization, which comprises generating an equalizer matrix for each element of a subset of a set of modulation symbols based upon an equalization function. The method also comprises generating a simplified equalizer matrix for each element of the set of modulation symbols not included in the subset utilizing an approximation for an inverse operation of the equalization function. Additionally, the method comprises equalizing each element of the set of modulation symbols as a function of the equalizer matrices and the simplified equalizer matrices.

In a further aspect, the present disclosure provides an apparatus that facilitates equalization, which comprises a processor that executes instructions for computing an equalizer matrix for a first modulation symbol based at least in part upon an equalizer function, computing a simplified equalizer matrix for a second modulation symbol based at least in part upon a simplification of the equalizer function utilizing an approximation, and equalizing a set of modulation symbols utilizing the equalizer matrix and the simplified equalizer matrix. The apparatus also comprises a memory that stores equalizer information.

In yet another aspect, the present disclosure provides an apparatus that facilitates equalization, which comprises means for generating equalizer matrices for a subset of modulation symbols based at least in part upon an equalizer function. The apparatus also comprises means for generating matrices for modulation symbols using a version of the equalizer function, the version utilizes an approximation for an inverse operation of the equalizer function. Additionally, the apparatus comprises means for computing a set of equalized modulation symbols utilizing the equalizer matrices and the interpolated matrices.

In another aspect, the present disclosure provides a computer-readable medium having instructions for calculating equalizer matrices for a subset of a set of modulation symbols based at least in part upon an equalizer function. The medium also includes instructions for calculating approximation matrices for the set of modulation symbols not included within the subset based upon an approximation of an inverse operation of the equalizer function. In addition, the medium has instructions for equalizing the set of modulation symbols as a function of the equalizer matrices and the interpolated matrices.

In a further aspect, the present disclosure provides a processor that executes computer-executable instructions that facilitate equalization. The instructions comprise generating a first set of equalizer matrices for a subset of a set of modulation symbols. The instructions also comprise generating a second set of equalizer matrices for the set of modulation symbols not included in the subset utilizing a simplification of the equalization function, the simplification utilizes an approximation in place of an inverse matrix operation. Additionally, the instructions comprise computing equalized modulation symbols for the set of modulation symbols based at least in part upon the first and second sets of equalizer matrices.

To the accomplishment of the foregoing and related ends, the one or more aspects comprise the features hereinafter fully described and particularly pointed out in the claims. The following description and the annexed drawings set forth in detail certain illustrative aspects. These aspects are indicative, however, of but a few of the various ways in which the principles described herein may be employed and the described aspects are intended to include their equivalents.

DETAILED DESCRIPTION

Figure 1:
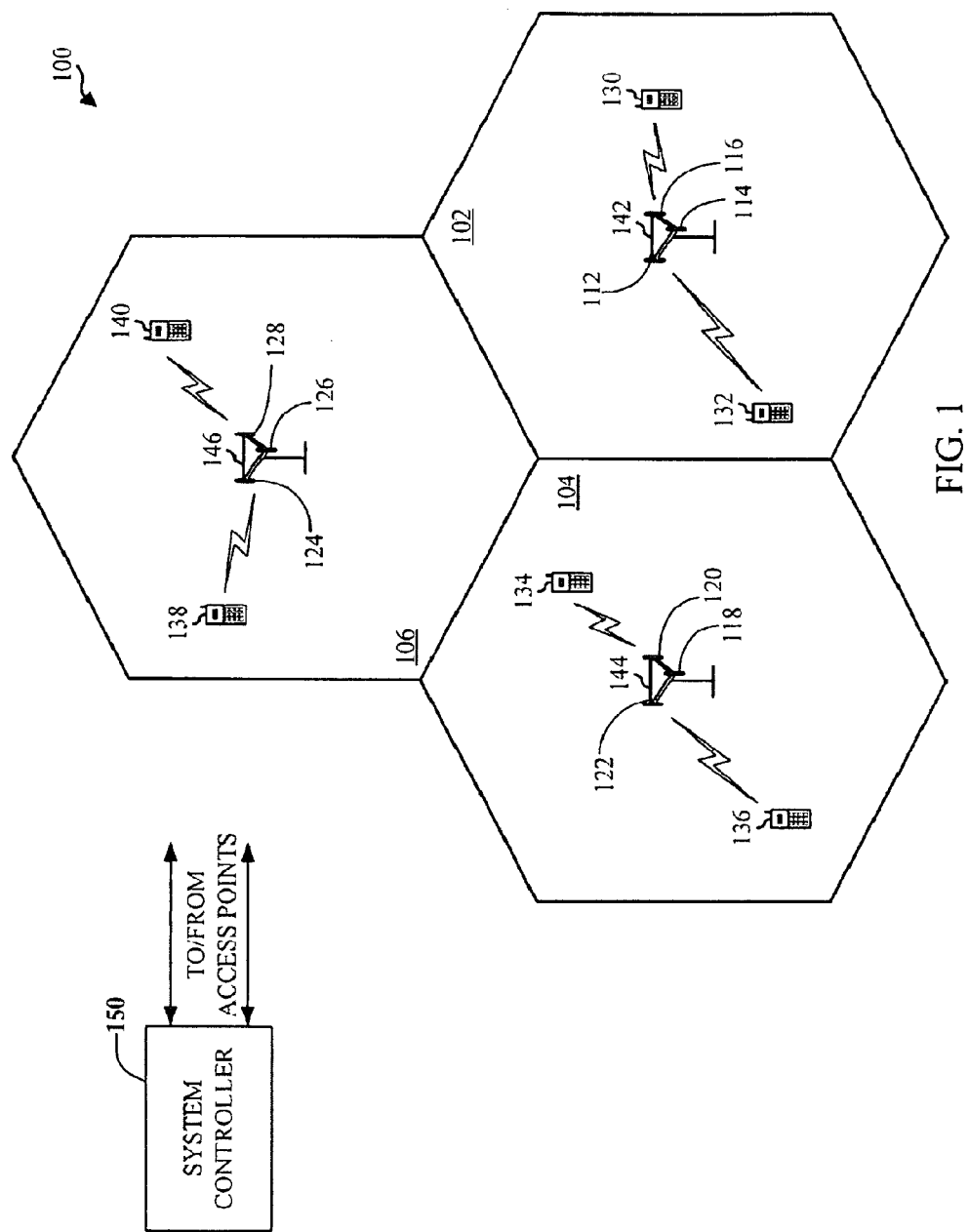
FIG. 1 is an illustration of a wireless communication system in accordance with one or more aspects presented herein.

Various aspects are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "system," and the like are intended to refer to an electronic device related entity, either hardware, a combination of hardware and software, software, firmware or software in execution. For example, a component may be, but is not limited to being, a process running on a processor, a processor, an object, an executable, a thread of execution, a program, and/or a computer. By way of illustration, both an application running on a communications device and the device can be a component. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a terminal. A terminal can also be called a system, a user device, a subscriber unit, subscriber station, mobile station, mobile device, remote station, access point, base station, remote terminal, access terminal, user terminal, terminal, user agent, or user equipment (UE). A terminal can be a cellular telephone, a cordless telephone, a Session Initiation Protocol (SIP) phone, a wireless local loop (WLL) station, a PDA, a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Turning now to the Figures, FIG. 1 illustrates a multiple access wireless communication system 100. Multiple access wireless communication system 100 includes multiple access points 142, 144, and 146. An access point provides communication coverage for a respective geographic area. An access point and/or its coverage area may be referred to as a "cell", depending on context in which the term is used. For example, the multiple access wireless communication system 100 includes multiple cells 102, 104, and 106. To improve system capacity, an access point coverage area can be partitioned into multiple smaller areas, referred to as sectors. Each sector is served by a respective base transceiver subsystem (BTS). The term "sector" can refer to a BTS and/or its coverage area depending upon context. For a sectorized cell, the base transceiver subsystem for all sectors of the cell is typically co-located within the access point for the cell. The multiple sectors may be formed by groups of antennas each responsible for communication with access terminals in a portion of the cell. For example, in cell 102, antenna groups 112, 114, and 116 each correspond to a different sector. In cell 104, antenna groups 118, 120, and 122 each correspond to a different sector. In cell 106, antenna groups 124, 126, and 128 each correspond to a different sector.

Each cell can include multiple access terminals that may be in communication with one or more sectors of each access point. For example, access terminals 130 and 132 are in communication with access point 142, access terminals 134 and 136 are in communication with access point 144, and access terminals 138 and 140 are in communication with access point 146.

It can be seen from FIG. 1 that each access terminal 130, 132, 134, 136, 138, and 140 is located in a different portion of its respective cell relative to each other access terminal in the same cell. Further, each access terminal may be at a different distance from the corresponding antenna groups with which it is communicating. Both of these factors provide situations, due to environmental and other conditions in the cell, which cause different channel conditions to be present between each access terminal and the corresponding antenna group with which it is communicating.

For a centralized architecture, a system controller 150 is coupled to access points 142, 144 and 146 and provides coordination and control of access points 142, 144 and 146 and further controls the routing of data for the terminals served by these access points. For a distributed architecture, access points 142, 144 and 146 may communicate with one another as needed, e.g., to server a terminal in communication with an access point, to coordinate usage of subbands, and the like. Communication between access points via system controller 150 or the like can be referred to as backhaul signaling.

As used herein, an access point can be a fixed station used for communicating with access terminals and may also be referred to as, and include some or all the functionality of, a base station. An access terminal may also be referred to as, and include some or all the functionality of, a user equipment (UE), a wireless communication device, a terminal, a mobile station or some other terminology.

An access point can manage multiple terminals by sharing the available system resources (e.g., bandwidth and transmit power) among the terminals. For example, in an orthogonal frequency division multiple access (OFDMA) systems, available frequency bandwidth is divided into segments, referred to as tiles. As used herein, a tile is a time frequency region. Data transmissions can be processed as tiles received at an access terminal.

Figure 2:
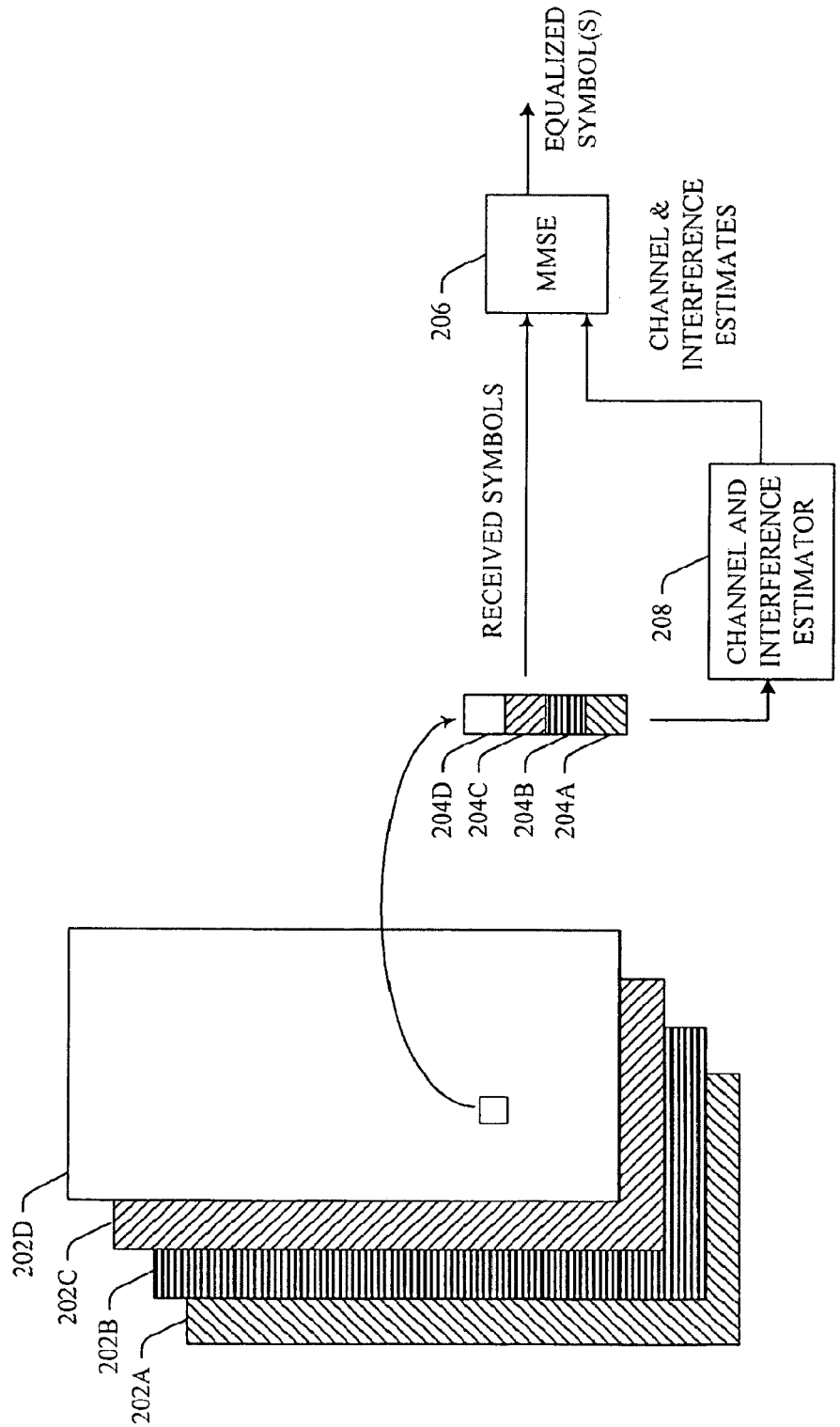
FIG. 2 illustrates processing of data received from multiple receive antennas in accordance with one or more aspects presented herein.

FIG. 2 illustrates an aspect that implements certain aspects of FIG. 1. In particular, FIG. 2 depicts processing of data received from multiple receive antennas. Many access points and terminals include multiple transmit and/or receive antennas. Multiple antennas and MIMO technology can be used to enhance data throughput and transmission range. However, reception of data at multiple receive antennas requires additional, complex processing. Typically, when a tile is transmitted a version of the tile is received at each antenna. The versions of the tile received at the different antenna are distinct due to differences in the channels or paths between the transmit antenna and the various receive antennas. In particular, proper spacing of receive antennas ensures that the received tiles are distinct. The received tiles can be analyzed to compute a single tile representative of the transmitted tile.

Generally, received data can be processed as tiles that include a predetermined number of OFDM symbols. For instance, each tile can include 128 modulation symbols over 16 tones. Modulation symbols can include data symbols as well as pilot symbols, which can be used as references to determine performance. Each antenna will receive a transmitted tile separately, resulting in multiple received tiles. Corresponding modulation symbols from multiple received tiles can be processed as a function of channel and interference estimates to generate a single equalized modulation symbol. The number of computations required to generate equalized modulation symbols increases as the number of antennas is increased. Typically, the number of computations increases linearly with the third power of the number of receive antennas, due to the matrix inversion operation commonly used in equalization. As the number of computations increases the time and/or processing power necessary to perform the computations increases.

In general, channels are highly correlated within a tile. Correlation of channels can be used to reduce the number of computations required to process data for a tile. In particular, the equalization process can be simplified, reducing the complexity of computations.

Turning once again to FIG. 2, a set of received tiles 202A, 202B, 202C and 202D is depicted. In this particular example, a tile transmitted by a single transmit antenna (not shown) has been received at four different receive antennas (not shown), generating receive tiles 202A, 202B, 202C and 202D. However, any number of transmit and/or receive antennas can be utilized. In the illustrated example, for each modulation symbol in the transmitted tile, four modulation symbols are received, one at each antenna. The four corresponding received data symbols 204A, 204B, 204C and 204D can be processed to generate a single, equalized modulation symbol. As illustrated, the data symbols 204A, 204B, 204C and 204D are inputs for a minimum mean squared error (MMSE) equalizer 206.

The data symbols 204A, 204B, 204C and 204D are also utilized by a channel and interference estimator 208 to generate channel estimates and interference estimates. Although a single channel and interference estimator 208 is illustrated for simplicity, a separate channel and interference estimator 208 can generate channel and interference estimates for each receive antenna. Thus, for each receive antenna, a separate set of channel and interference estimates can be computed. The channel and interference estimator 208 can compute one channel estimate for each modulation symbol within a tile. However, the channel estimates within a tile, for a particular receive antenna, are highly correlated. As used herein, a channel estimate is an estimate of the response of a wireless channel from a transmitter to a receiver. Channel estimation is typically performed by transmitting pilot symbols within the tiles that are known a priori by both the transmitter and receiver. The channel and interference estimator 208 can estimate the channel gains as a ratio of the received pilot symbols over the known pilot symbols. Interference can result from multiple transmitters transmitting their pilot signals simultaneously. Such transmitters can be located at different access points within a wireless environment, or can be different antennas of the same access point. Pilot interference degrades the quality of the channel estimate. The power of the interference for the time-frequency region or tile is estimated and referred to herein as the interference estimate. MMSE 206 can utilize channel estimates, interference estimates and received data symbols 204A, 204B, 204C and 204D to generate an equalized modulation symbol.

Figure 3:
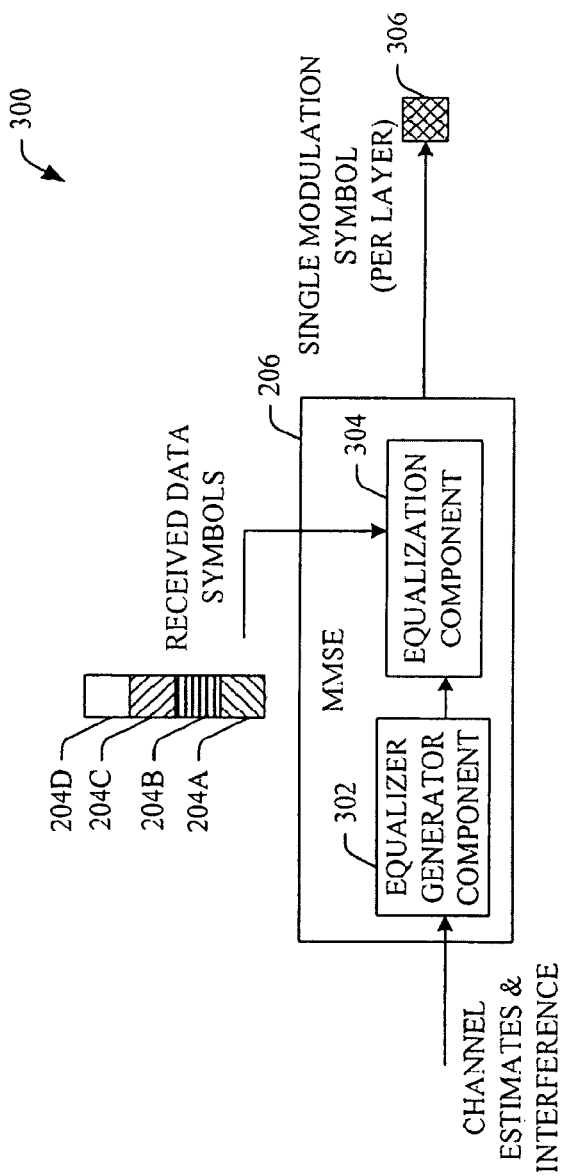
FIG. 3 illustrates a system that equalizes received data in accordance with one or more aspects presented herein.

Referring now to FIG. 3, an aspect implementing certain aspects described with respect to FIG. 2 is illustrated. System 300 performs equalization for received data symbols. MMSE equalizer 206 can include an equalizer generator component 302 that generates an equalization matrix based upon channel estimates and interference estimates. In particular, for each modulation symbol within a transmitted tile, the equalizer generator component 302 can obtain a channel estimate and an interference estimate corresponding to each received tile. For example, if a transmitted tile is received by four separate receive antennas, equalizer generator component 302 can obtain four separate channel estimates and four interference estimates corresponding to each transmitted modulation symbol.

The generated equalizer matrix can be utilized by an equalization component 304 to generate equalized modulation symbols. For example, equalization component 304 can obtain corresponding modulation symbols 204A, 204B, 204C and 204D from a set of received tiles and process the modulation symbols 204A, 204B, 204C and 204D utilizing the equalizer matrix to generate a single equalized modulation symbol 306. A single modulation symbol 306 is generated as a function of four corresponding modulation symbols 204A, 204B, 204C and 204D and the equalizer matrix. Here, a single modulation symbol 306 is generated because a single transmit antenna was utilized in the example. However, if multiple transmit antennas were utilized, a separate equalized modulation symbol 306 would be generated for each transmitted tile or layer.

Figure 4:
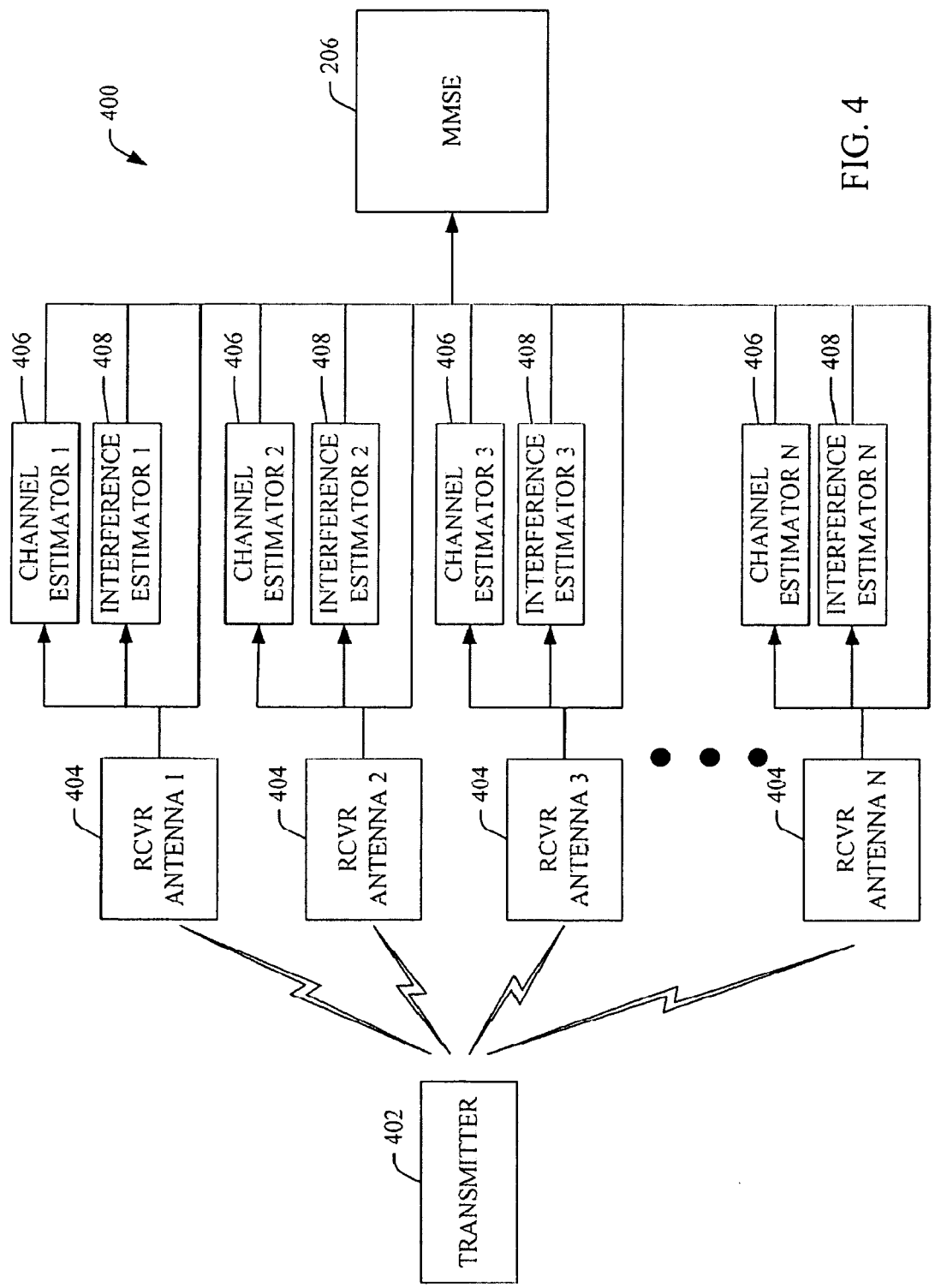
FIG. 4 is a block diagram of a system that utilizes multiple receive antennas in accordance with one or more aspects presented herein.

Turning now to FIG. 4, an aspect is depicted that implements certain aspects of FIG. 2. System 400 utilizes simplified equalization to generate equalized data symbols. A transmitter 402 can transmit a series of tiles. Although, a single transmitter 402 is illustrated for simplicity, the system 400 can include multiple transmitters. Each tile can be received by one or more receive antennas 404. While four receive antennas 404 are illustrated, any number of antennas can be utilized. Each tile consists of a set of successive OFDM symbols transmitted over a set of contiguous tones. The number of modulation symbols within a tile can be represented as $N_S \times N_T$, where $N_S$ represents the number of OFDM symbols and $N_T$ is equal to the number of tones. A single modulation symbol can be denoted by (t, s), where t is the tone and s is the particular OFDM symbol. Modulation symbol channels for a tile can be represented as a $N_S \times N_T$ matrix $H_{i,j}$, where i indicates the receive antenna that received the tile and j represents the transmit antenna. Accordingly, channels for a particular modulation symbol (t,s) can be represented by a $M_R \times R$ matrix H(t,s), where $M_R$ is the number of receive antenna and R is the transmit antenna number. For example, if a single antenna transmits a tile received by four antennas, modulation symbol (t,s) can be represented by a matrix H(t,s) including four separate corresponding modulation symbol channels; one for each receive antenna 404.

Each receive antenna 404 provides data from a received tile to a separate channel estimator 406 and an interference estimator 408. Each channel estimator 406 generates a channel estimate for each modulation symbol. The channel estimates for a tile $H_{i,j}(t,s)$ are denoted by $\hat{H}_{i,j}(t,s)$. For a sub-tile, the matrix of channel estimates depend only on $3 \times M_R \times R$, where R is the rank (based upon the number of transmit antennas) and $M_R$ is the number of receive antennas. Choosing one modulation symbol $(t_0, s_0)$ within the tile, channel estimates for other modulation symbols can be computed using the following example formula:

$$\hat{H}_{i,j}(t,s) = \hat{H}_{i,j}(t_0, s_0) + (t-t_0)\Delta_{T,i,j} + (s-s_0)\Delta_{S,i,j}$$

Here, $\Delta_{T,i,j}$ and $\Delta_{S,i,j}$ are computed during channel estimation and represent the change in channel estimate between proximate tones and OFDM symbols, respectively. The matrices for channel estimates $\hat{H}(t,s)$ can be generated as follows:

$$\hat{H}(t,s) = \hat{H}(t_0, s_0) + (t-t_0)\Delta_T + (s-s_0)\Delta_S$$

Here, $\Delta_T$ and $\Delta_S$ are $M_R \times R$ matrices.

Interference estimator 408 determines an estimated interference power for each modulation symbol. In particular, the interference estimate for each receive antenna i and modulation symbol (t,s) can be denoted by $\hat{\sigma}_i^2(t,s)$. The channel and interference estimates are computed separately for each receive antenna 404 and can be provided together with the received data symbols to MMSE equalizer 206.

Figure 5:
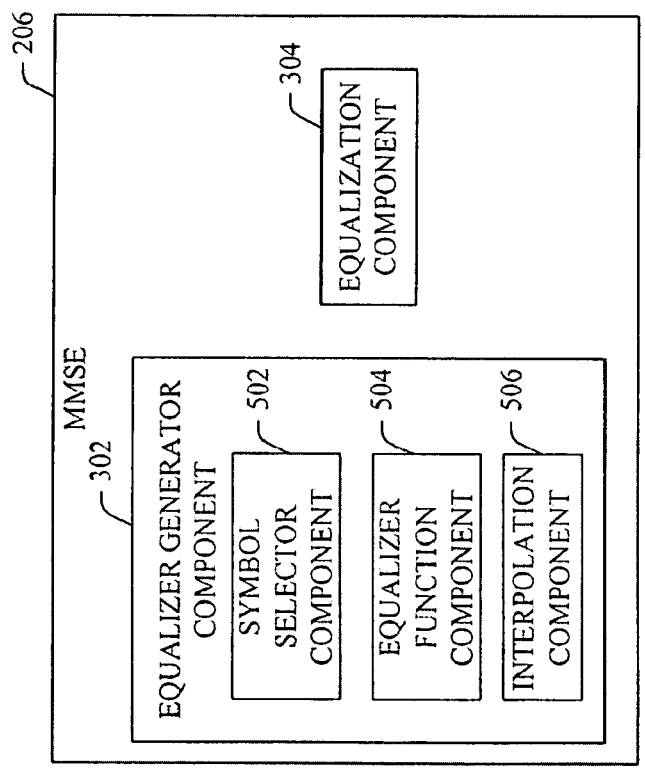
FIG. 5 is block diagram of an MMSE equalizer in accordance with one or more aspects presented herein.

FIG. 5, illustrates an aspect of an equalizer employing certain aspects described with respect to FIG. 3. MMSE equalizer 206 performs a simplified equalization procedure. Equalizer generator component 302 can compute a separate equalization matrix for each modulation symbol. Typically, for each modulation symbol (t, s) an equalizer matrix can be computed as follows:

$$G(t,s) = f(\hat{H}(t,s), \hat{\sigma}_1^2(t,s), \ldots, \hat{\sigma}_{M_R}^2(t,s))$$

Here, G(t,s) is an R×$M_r$ equalization matrix computed using equalizer function $f$, based upon channel estimates and interference estimates. A variety of functions, $f$, can be used to generate the equalizer matrix. Once the equalization matrix has been computed, equalization component 304 can compute an equalized data symbol or symbols as follows:

$$b(t,s) = G(t,s)x(t,s)$$

Here, b(t, s) is an R×1 vector of equalized modulation symbols and x(t,s) is a $M_r$×1 vector of received complex modulation symbols, where R is the number of transmit antennas and $M_r$ is the number of receive antennas.

Computing the equalizer matrix $G(t,s) = f(\hat{H}(t,s), \hat{\sigma}_1^2(t,s), \ldots, \hat{\sigma}_{M_g}^2(t,s))$ for each modulation symbol within the tile separately can be extremely expensive. The number and/or complexity of computations can be greatly reduced based upon channel estimates and interference estimates properties as well as properties of the equalizer function $f$. In particular, channel estimates for modulation symbols are correlated within the limited boundaries of a single tile. Proximate channel estimates are not independent and are unlikely to vary greatly among the modulation symbols of a tile. Typically, channels vary slowly between proximate modulation symbols. Additionally, even if channel parameters were to change quickly, channel estimation algorithms are generally unable to detect rapid variations of a channel within a tile. Therefore, correlation of channel estimates is typically stronger than correlation among channel parameters for a tile.

Correlation among the channel estimates is reflected within the equalizer matrix. Equalizer matrices also vary slowly with the channel estimate. Equalizers are a function of both channel estimate and interference estimate. However, interference estimates are limited to a relatively small number of values. Typically, for a portion of the tile, a subtile, interference estimators provide only a single interference variance for the entire subtile. Thus interference variance estimates do not depend upon the modulation symbol (and need not be computed for each modulation symbol). Consequently, equalizer matrices are dependent primarily upon the channel estimate. Based upon this correlation, the required computations for generating equalizer matrices can be greatly reduced without greatly impacting performance.

The equalizer generator component 302 can greatly reduce the computational expense by using interpolation to generate equalizer matrices. A symbol selection component 502 can identify a subset or sample of modulation symbols for which the equalizer matrices are generated using the equalizer function $f$. An equalizer function component 504 can generate the equalizer matrix for the sample set as follows:

$$G(t,s) = f(\hat{H}(t,s), \hat{\sigma}_1^2(t,s), \ldots, \hat{\sigma}_{M_g}^2(t,s))$$

However, an interpolation component 506 can generate the remainder of the equalizer matrices using interpolation. In general, interpolation can require significantly less complex computations that an equalizer function $f$.

Symbol selection component 502 can utilize any suitable method for identifying or selecting the sample set. In aspects, a predetermined sample set can be selected. For example, the sample set can be defined such that the modulation symbols are evenly spread throughout the tile.

In addition, the number of modulation symbols within the sample set can vary. Using a larger sample set can increase the number of complex computations, however, the performance may be enhanced by an increased sample size. The size of the sample set can be adjusted based upon the available processor and processing load. The size of the sample set may be fixed based upon available resources. Alternatively, symbol selection component 502 can dynamically adapt to available resources and vary sample set size to optimize performance.

Interpolation component 506 can utilize a variety of interpolation methods to compute an equalizer matrix for those modulation symbols not included in the sample set. In particular, interpolation component 506 can utilize linear interpolation, polynomial interpolation, and/or spline interpolation. Generally, channel estimates for a tile are highly correlated, as described above. Consequently, interpolation can be used to generate a relatively accurate equalizer matrix, while requiring significantly fewer complex computations than typical equalizer functions.

Figure 6:
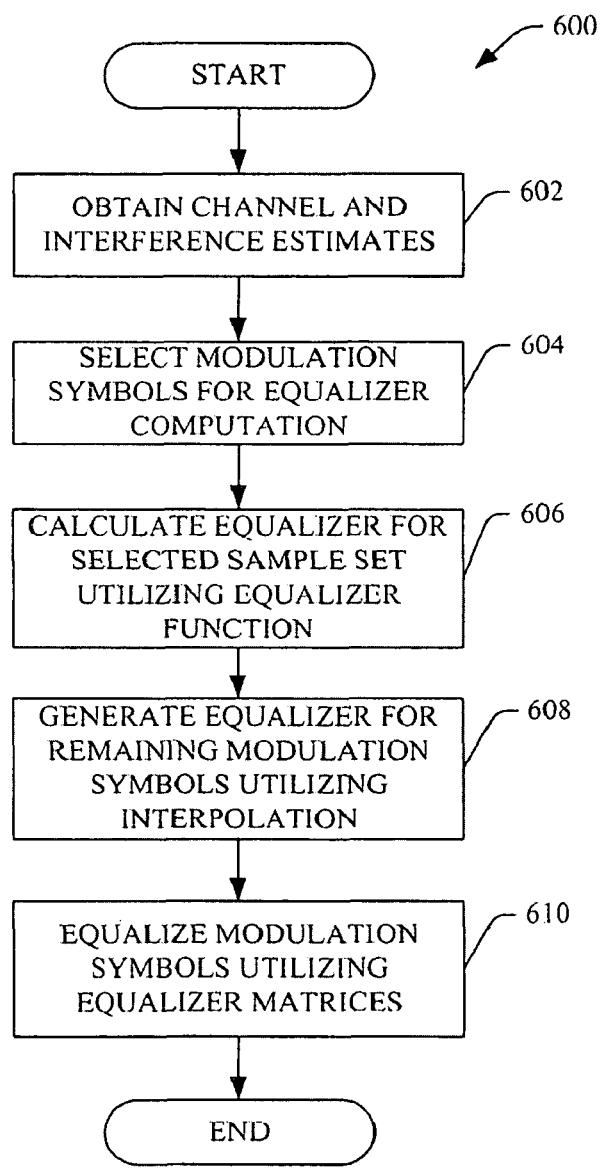
FIG. 6 illustrates a methodology for equalizing received data utilizing interpolation in accordance with one or more aspects presented herein.

Referring now to FIG. 6, an aspect implementing certain aspects described with respect to FIG. 5 is depicted. In particular, a methodology 600 that facilitates equalization of a transmitted tile is illustrated. At 602, channel and interference estimates are obtained. In particular, channel estimates can be generated based upon pilot symbols included within a tile. Separate channel estimates and interference estimates are generated for each received tile. Consequently, for each modulation symbol, a vector of channel estimates corresponding to the received tiles is obtained. Similarly, a vector of interference estimates corresponding to received tiles is also obtained.

At 604, a subset or sample set of the modulation symbols can be selected for equalizer matrix computation. The number of modulation symbols selected for the sample set can vary. In particular, the size of the sample set can be adjusted based upon available processing power. Alternatively, a predetermined subset of modulation symbols can be selected each time. For example, the sample set can contain modulation symbols evenly distributed across the tile to facilitate interpolation. At 606, equalizer matrices can be generated for the selected modulation symbols utilizing an equalizer function.

At 608, equalization matrices can be generated for the modulation symbols not included within the sample set utilizing interpolation. Any form of interpolation (e.g., linear, polynomial or spline) can be utilized to generate equalizer matrices. The equalizer matrices can be used to equalize modulation symbols received at multiple antennas at 610.

Figure 7:
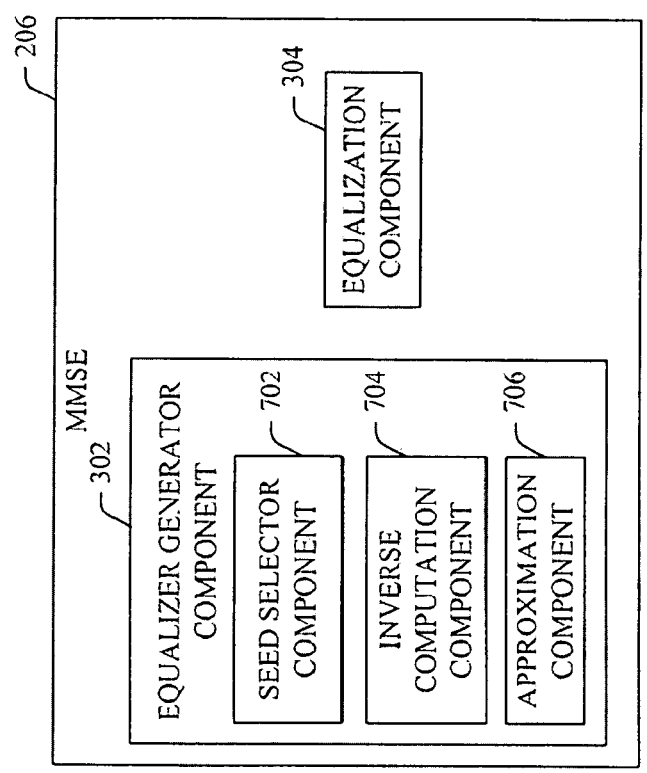
FIG. 7 is block diagram of an alternate MMSE equalizer in accordance with one or more aspects presented herein.

FIG. 7, illustrates a further aspect of equalizer implementing certain aspects described with respect to FIG. 3. MMSE equalizer 206 utilizes simplified computation of the equalizer function. MMSE equalizer 206 can utilize a variety of equalizer functions, $f$, to generate equalizer matrices based upon channel and interference estimates. Equalizer function computations can be simplified based upon correlation of channel estimates. In particular, equalizer functions typically include a matrix inversion computation, a computationally expensive operation. Taylor approximations can be used to approximate the matrix inversion. Simplification can be tailored to the specific equalizer function.

Typically, during MMSE equalization, for each pair (t,s), MMSE equalizer function, $f$, computes the inverse of the following matrix:

$$P(t,s) = (H^H(t,s)H(t,s) + I)^{-1}$$

Here, H(t,s) denotes a matrix of channel estimates appropriately scaled by values of the interference estimates and I is the identity matrix. To simplify this computation, the inverse function can be replaced by a first order Taylor approximation. To simplify the equations, H(t,s) can be replaced by H and $H(t_0,s_0)$ can be replaced by $H_0$. In addition, all channel quantities are estimated, unless otherwise noted.

Denote $P_0 = (H_0^H H_0 + I)^{-1}$, and $H = H_0 + \Delta$.

The equation for P can be adapted as follows:

$$\begin{aligned} P &= ((H_0 + \Delta)^H (H_0 + \Delta) + I)^{-1} \\ &= (H_0^H H_0 + \Delta^H H_0 + H_0^H \Delta + \Delta^H \Delta + I)^{-1} \\ &= ((H_0^H H_0 + I)(I + (H_0^H H_0 + I)^{-1}(\Delta^H H_0 + H_0^H \Delta + \Delta^H \Delta)))^{-1} \\ &= (I + (H_0^H H_0 + I)^{-1}(\Delta^H H_0 + H_0^H \Delta + \Delta^H \Delta))^{-1}(H_0^H H_0 + I)^{-1} \\ &= (I + P_0(\Delta^H H_0 + H_0^H \Delta + \Delta^H \Delta))^{-1} P_0 \end{aligned}$$

Here, the Taylor approximation relies on the assumption that the eigenvalues of the following matrix are small when compared to one:

$$P_0(\Delta^H H_0 + H_0^H \Delta + \Delta^H \Delta)$$

Based upon this assumption, the first order Taylor approximation of the inverse results in the following equation:

$$P \approx (I - P_0(\Delta^H H_0 + H_0^H \Delta + \Delta^H \Delta))P_0 \approx P_0 - P_0(\Delta^H H_0 + H_0^H \Delta)P_0,$$

Here, the term $\Delta^H \Delta$ was dropped from the last expression, since it is assumed to be small in comparison to the other terms.

Utilizing a Taylor approximation can result in a reduction in computational complexity. Recalling the channel estimate formula:

$$\hat{H}(t,s) = \hat{H}(t_0,s_0) + (t-t_0)\Delta_T + (s-s_0)\Delta_S$$

Then:

$$P_{t,s} \approx P_0 - (t-t_0)P_0(\Delta_T^H H_0 + H_0^H \Delta_T)P_0 - (s-s_0)P_0(\Delta_S^H H_0 + H_0^H \Delta_S)P_0$$

Here, $P_0$ is an R×R matrix and $\Delta_T$, $\Delta_S$ and $H_0$ are all $M_R \times R$ matrices. Complexity can be reduced by computing the exact inverse $P_{t,s}$ for a subset of modulation symbols $(t_i, s_i)$, referred to herein as seeds. The $P_{t,s}$ can be computed for the remaining symbols using the approximation and the computed inverse for the closest modulation symbol.

$$H_{t_i,s_i} = H_0 + (t_i - t_0)\Delta_T + (s_i - s_0)\Delta_S;$$

$$P_{t,s} \approx P_{t_i,s_i} - (t-t_i)P_{t_i,s_i}(\Delta_T^H H_{t_i,s_i} + H_{t_i,s_i}^H \Delta_T)P_{t_i,s_i} - (s-s_i)P_{t_i,s_i}(\Delta_S^H H_{t_i,s_i} + H_{t_i,s_i}^H \Delta_S)P_{t_i,s_i}$$

Where, $\Delta_T^H H_{t_i,s_i}$ and $\Delta_S^H H_{t_i,s_i}$ can be computed as follows:

$$\Delta_T^H H_{t_i,s_i} = \Delta_T^H H_0 + (t_i - t_0)\Delta_T^H \Delta_T + (s_i - s_0)\Delta_T^H \Delta_S$$

$$\Delta_S^H H_{t_i,s_i} = \Delta_S^H H_0 + (t_i - t_0)\Delta_S^H \Delta_T + (s_i - s_0)\Delta_S^H \Delta_S$$

Turning once again to FIG. 7, equalizer generator component 302 can include a seed selector component 702 that determines which modulation symbols are used as seeds, where seeds are the subset of modulation symbols for which the inverse matrix operation will be performed. The number and set of seeds can be predetermined and selected to evenly distribute seeds within the tile. Alternatively, seed selector component can vary the number and/or specific modulation symbols selected as seeds based upon performance, processing power or any other factors.

The inverse computation component 704 can perform the inverse operation and generate the equalizer matrix utilizing the original equalizer function for those modulation symbols selected as seeds. An approximation component 706 can generate equalizer matrices for the remaining modulation symbols using an approximation rather than the inverse operation. In particular, approximation component 706 can utilize a first order Taylor approximation to generate an equalizer matrices. Equalization component 304 can utilize the generated equalizer matrices to process modulation symbols and produce equalized modulation symbols.

The use of approximations to replace inverse operations results in simplified processing. The necessary computations are evaluated below. To process a single tile utilizing approximations, the following computations will be performed:

TABLE 1

Required Computations per Tile

| Value to be Computed | Complex Multiplications | Complex Additions |
|---|---|---|
| $\Delta_T^H H_0$ | $M_R \times R^2$ | $(M_R - 1) \times R^2$ |
| $\Delta_S^H H_0$ | $M_R \times R^2$ | $(M_R - 1) \times R^2$ |
| $\Delta_S^H \Delta_S$ | $M_R \times R^2/2$ | $(M_R - 1) \times R^2/2$ |
| $\Delta_T^H \Delta_S$ | $M_R \times R^2$ | $(M_R - 1) \times R^2$ |
| $\Delta_T^H \Delta_T$ | $M_R \times R^2/2$ | $(M_R - 1) \times R^2/2$ |

Each seed will require the following computations:

TABLE 2

Required Computations per Seed

| Value to be Computed | Multiplications | Complex Additions |
|---|---|---|
| $\Delta_T^H H_{t_i,s_i}$ | $4 \times R^2$ Real Multiplications | $2 \times R^2$ |
| $\Delta_S^H H_{t_i,s_i}$ | $4 \times R^2$ Real Multiplications | $2 \times R^2$ |
| $P_{t_i,s_i}(\Delta^H H_{t_i,s_i} + H_{t_i,s_i}^H \Delta)$ | $R^3$ complex multiplications | $R^3$ |
| $P_{t_i,s_i}(\Delta^H H_{t_i,s_i} + H_{t_i,s_i}^H \Delta)P_{t_i,s_i}$ | $R^3/2$ complex multiplications | $R^3/2$ |

Where, $\Delta_T^H H_{t_i,s_i}$ is computed as follows: $\Delta_T^H H_{t_i,s_i} = \Delta_T^H H_0 + (t_i - t_0)\Delta_T^H \Delta_T + (s_i - s_0)\Delta_T^H \Delta_S$
Where $\Delta_S^H H_{t_i,s_i}$ is computed as follows: $\Delta_S^H H_{t_i,s_i} = \Delta_S^H H_0 + (t_i - t_0)\Delta_S^H \Delta_T + (s_i - s_0)\Delta_S^H \Delta_S$ For each modulation symbol $2 \times R^2$ additions are required.

The total number of real multiplications:

Global: $16 \times M_R \times R^2$

For each seed: $2 \times 6 \times R^3$

Consequently, the total number of multiplications necessary for a tile is $$(12 \times R^3 + 8 \times R^2 + M_R(6R^2 + 8R)) \times n_{SEEDS} + 16 M_R \times R^2),$$

Where, $n_{SEEDS}$ is the number of seeds for which the inverse is computed. The reduction in total multiplications can be calculated as follows:

$$f = \frac{M_R(6R^2 + 8R) \times N_S \times N_T}{(12 \times R^3 + 8 \times R^2 + M_R(6R^2 + 8R)) \times n_{SEEDS} + 16 M_R \times R^2}$$

For example, if the number of transmit antennas and receive antennas are both equal to four, $R = M_R = 4$, the reduction in multiplications would be as follows:

$$f = \frac{512 \times N_S \times N_T}{1408 \times n_{SEEDS} + 1024} \approx 0.36 \frac{N_S \times N_T}{n_{SEEDS} + 1}$$

Furthermore, if the number of modulation symbols per tile is equal to sixteen and the number of tones is eight, $N_S \times N_T = 16 \times 8$, and the number of seeds is equal to nine, $n_{SEEDS} = 9$, then the number of multiplications is reduced by a factor of 4.65, f=4.65. The number of additions is equal to the following:

$$2 \times R^2 \times (N_S N_T - N_{SEEDS}) + (M_R - 1) \times R^2 \times 8 + N_{SEEDS} \times 2 \times (4 \times R^2 + R^3 + R/2) + 2 \times n_{COMPLEX\_MULT}$$

Figure 8:
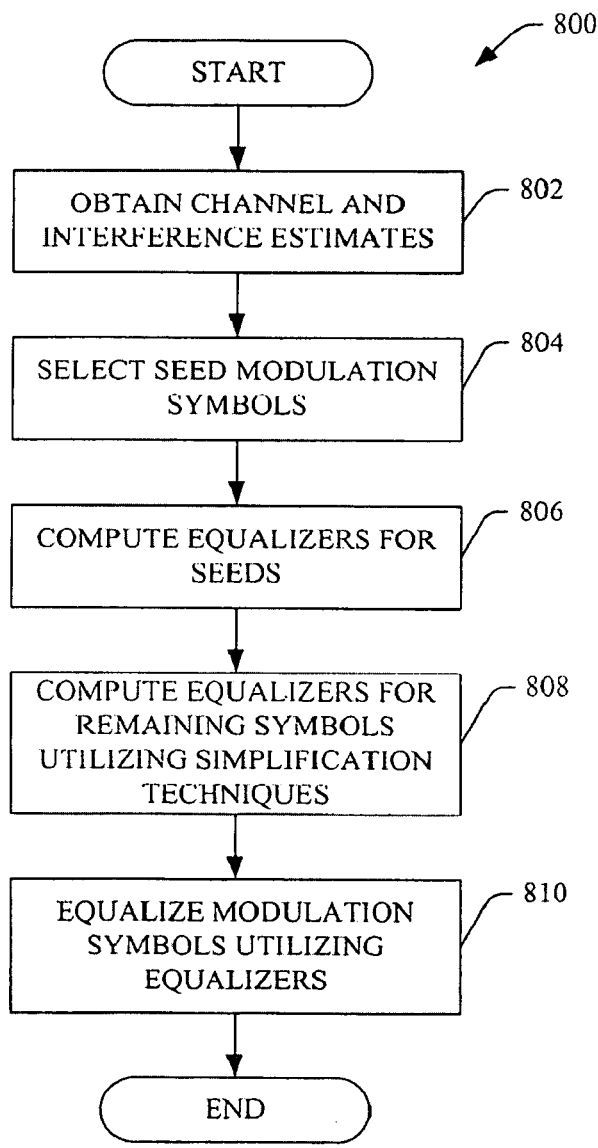
FIG. 8 illustrates a methodology for equalizing received data utilizing approximations in accordance with one or more aspects presented herein.

Referring now to FIG. 8, an aspect implementing certain aspects described with respect to FIG. 7 is depicted. In particular, a methodology 800 for simplifying equalizer function computations is illustrated. At 802, channel and interference estimates are obtained for each of the tiles. At 804, a subset of the modulation symbols can be selected to serve as seeds. A predetermined number and set of modulation symbols can be selected as seeds. Alternatively, seeds can be randomly selected, selected to distribute evenly across the tile or using any other suitable selection process. The number of seeds can be selected based upon performance, processing power or any other factor.

At 806, equalizer matrices can be generated for the seeds without utilizing simplification techniques. For example, when the equalizer function includes an inverse operation, the inversion operation will be performed without utilizing approximations. Equalizer matrices for the remaining modulation symbols can be generated at 808 utilizing simplification techniques. For example, inverse operations for the remaining modulation symbols can be computed or rather approximated using an approximation, such as a first order Taylor approximation. At 810, the equalizer can be utilized to perform equalization.

Referring to FIGS. 6 and 8, methodologies for performing equalization are illustrated. While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with one or more aspects.

It will be appreciated that inferences can be made regarding classification of terminal, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 9:
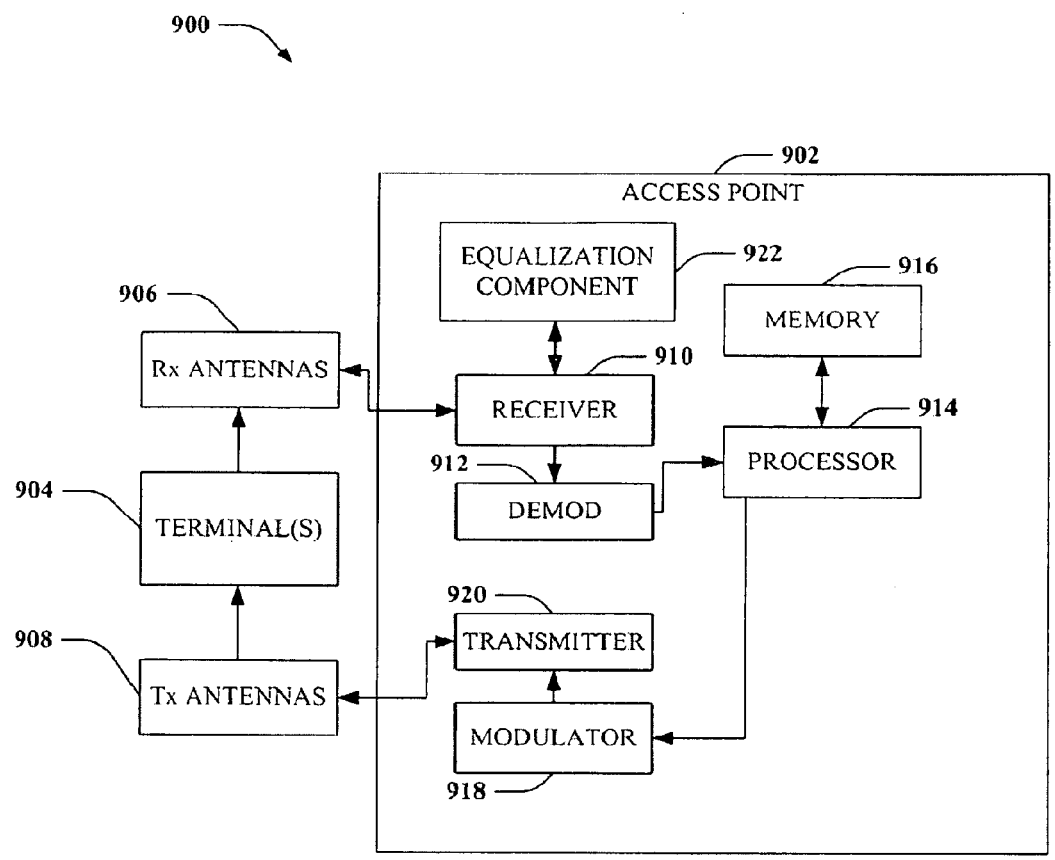
FIG. 9 is an illustration of a wireless communication system in accordance with one or more aspects presented herein.

FIG. 9 illustrates an aspect implementing certain aspects of FIG. 1. System 900 facilitates equalization in a communication environment. System 900 comprises an access point 902 with a receiver 910 that receives signal(s) from one or more terminals 904 through one or more receive antennas 906, and transmits to the one or more terminals 904 through a plurality of transmit antennas 908. In one or more aspects, receive antennas 906 and transmit antennas 908 can be implemented using a single set of antennas. Receiver 910 can receive information from receive antennas 906 and is operatively associated with a demodulator 912 that demodulates received information. Receiver 910 can be an MMSE-based receiver, or some other suitable receiver for separating out terminals assigned thereto, as will be appreciated by one skilled in the art. According to various aspects, multiple receivers can be employed (e.g., one per receive antenna), and such receivers can communicate with each other to provide improved estimates of user data. Access point 902 further comprises an equalization component 922, which can be a processor distinct from, or integral to, receiver 910. Equalization component 922 can utilize interpolation and/or approximations to reduce the complexity of computations required to equalize received signals.

Demodulated symbols are analyzed by a processor 914. Processor 914 is coupled to a memory 916 that stores information related to equalization, such as the equalizer function, equalizer matrices, information regarding the selected subset of modulation symbols for interpolation or seeds, and any other data related to equalization. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 916 of the subject systems and methods is intended to comprise, without being limited to, these and any other suitable types of memory. Receiver output for each antenna can be jointly processed by receiver 910 and/or processor 914. A modulator 918 can multiplex the signal for transmission by a transmitter 920 through transmit antennas 908 to terminals 904.

Figure 10:
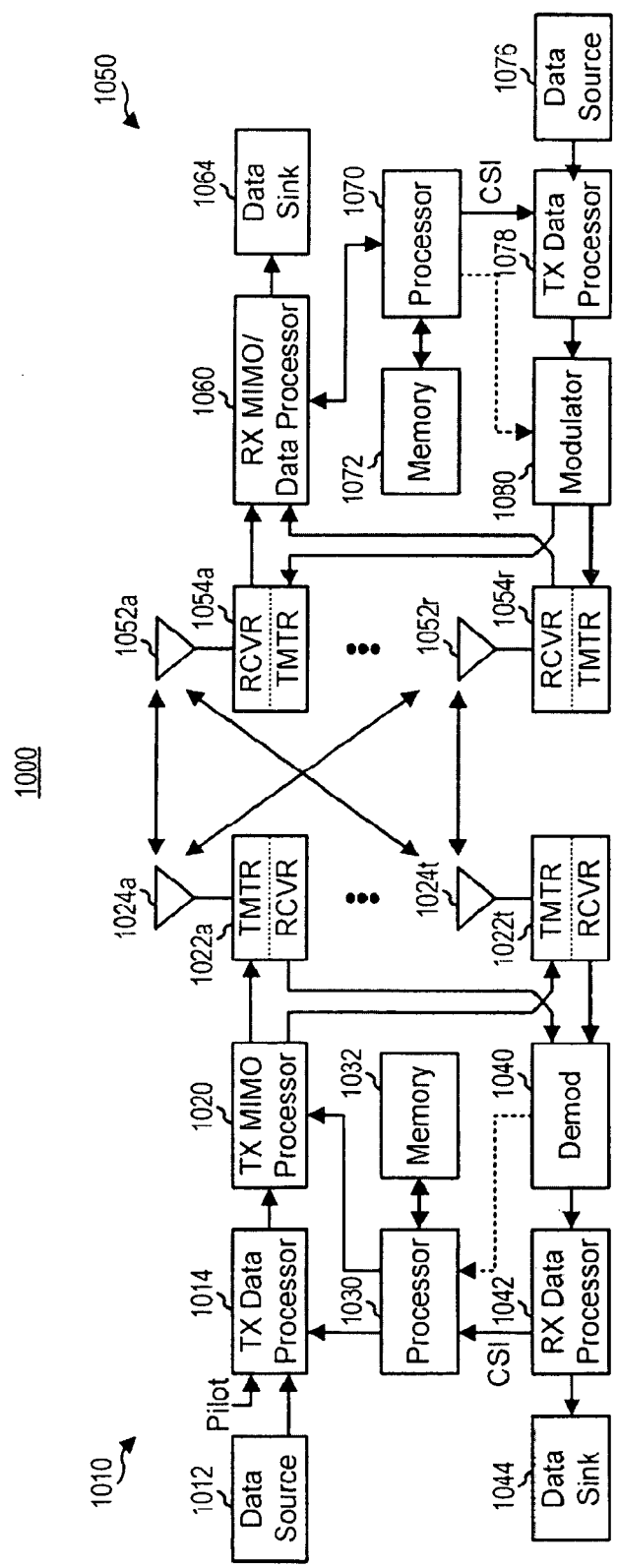
FIG. 10 is an illustration of a wireless communication environment that can be employed in conjunction with the various systems and methods described herein.

Referring to FIG. 10, a further aspect of FIG. 1 depicting a transmitter and receiver in a multiple access wireless communication system 1000 is illustrated. At transmitter system 1010, traffic data for a number of data streams is provided from a data source 1012 to a transmit (TX) data processor 1014. In an embodiment, each data stream is transmitted over a respective transmit antenna. TX data processor 1014 formats, codes, and interleaves the traffic data for each data stream based on a particular coding scheme selected for that data stream to provide coded data. In some embodiments, TX data processor 1014 applies precoding weights to the symbols of the data streams based upon the user and the antenna from which the symbols are being transmitted. In some embodiments, the precoding weights may be generated based upon an index to a codebook generated at the transceiver, 1054 and provided as feedback to the transceiver, 1022, which has knowledge of the codebook and its indices. Further, in those cases of scheduled transmissions, the TX data processor 1014 can select the packet format based upon rank information that is transmitted from the user.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 1030. Processor 1030 can be coupled to a memory 1032 that can maintain coding scheme information. As discussed above, in some embodiments, the packet format for one or more streams may be varied according to the rank information that is transmitted from the user.

The modulation symbols for all data streams are then provided to a TX MIMO processor 1020, which may further process the modulation symbols (e.g., for OFDM). TX MIMO processor 1020 then provides $N_T$ modulation symbol streams to $N_T$ transceivers (TMTR) 1022a through 1022t. In certain embodiments, TX MIMO processor 1020 applies precoding weights to the symbols of the data streams based upon the user to which the symbols are being transmitted to and the antenna from which the symbol is being transmitted from that user channel response information.

Each transceiver 1022 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1022a through 1022t are then transmitted from $N_T$ antennas 1024a through 1024t, respectively.

At receiver system 1050, the transmitted modulated signals are received by NR antennas 1052a through 1052r and the received signal from each antenna 1052 is provided to a respective transceiver (RCVR) 1054. Each transceiver 1054 conditions (e.g., filters, amplifies, and downconverts) a respective received signal, digitizes the conditioned signal to provide samples, and further processes the samples to provide a corresponding "received" symbol stream.

An RX data processor 1060 then receives and processes the NR received symbol streams from NR transceivers 1054 based on a particular receiver processing technique to provide $N_T$ "detected" symbol streams. The processing by RX data processor 1060 is described in further detail below. The traffic data may be provided to a data sink 1064. Processor 1070 can be coupled to a memory 1072 that maintains decoding information. Each detected symbol stream includes symbols that are estimates of the modulation symbols transmitted for the corresponding data stream. RX data processor 1060 then demodulates, deinterleaves, and decodes each detected symbol stream to recover the traffic data for the data stream. The processing by RX data processor 1060 is complementary to that performed by TX MIMO processor 1020 and TX data processor 1014 at transmitter system 1010.

The channel response estimate generated by RX processor 1060 may be used to perform space, space/time processing at the receiver, adjust power levels, change modulation rates or schemes, or other actions. RX processor 1060 may further estimate the signal-to-noise-and-interference ratios (SNRS) of the detected symbol streams, and possibly other channel characteristics, and provides these quantities to a processor 1070. RX data processor 1060 or processor 1070 may further derive an estimate of the "operating" SNR for the system.

Processor 1070 then provides estimated channel state information (CSI), which may comprise various types of information regarding the communication link and/or the received data stream. For example, the CSI may comprise only the operating SNR. The CSI is then processed by a TX data processor 1078, which also receives traffic data for a number of data streams from a data source 1076, modulated by a modulator 1080, conditioned by transceivers 1054a through 1054r, and transmitted back to transmitter system 1010.

At transmitter system 1010, the modulated signals from receiver system 1050 are received by antennas 1024, conditioned by receivers 1022, demodulated by a demodulator 1040, and processed by a RX data processor 1042 to recover the CSI reported by the receiver system. The demodulated signals can be provided to a data sink 1044. The reported quantized information, e.g. CQI, is then provided to processor 1030 and used to (1) determine the data rates and coding and modulation schemes to be used for the data streams and (2) to generate various controls for TX data processor 1014 and TX MIMO processor 1020.

The techniques described herein may be implemented by various means. For example, these techniques may be implemented in hardware, software, or a combination thereof. For a hardware implementation, the processing units (e.g., processors 1030 and 1070, TX data processors 1014 and 1078, TX MIMO processor 1020, RX MIMO/data processor 1060, RX Data processor 1042, and so on) for these techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

Figure 11:
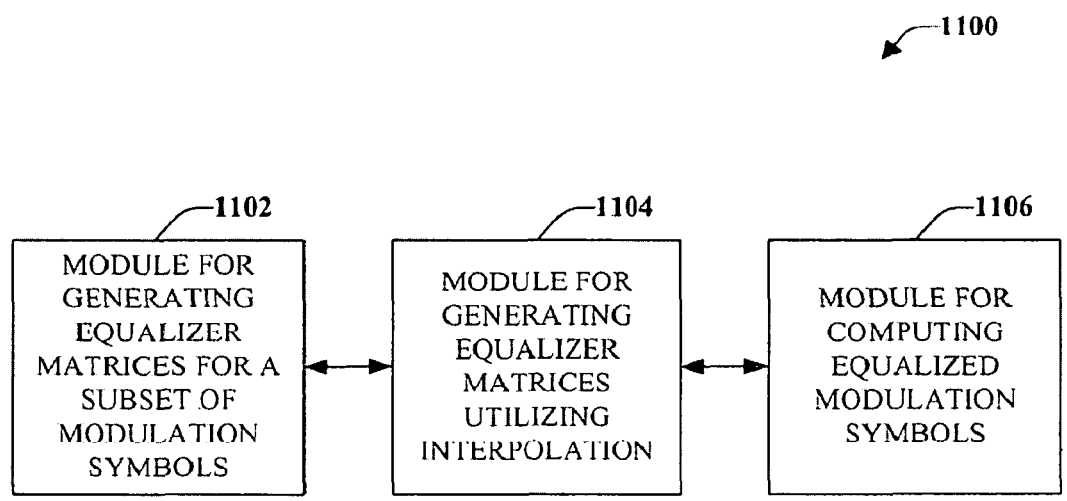
FIG. 11 is an illustration of a system that performs simplified equalization utilizing interpolation in accordance with one or more aspects presented herein.

FIG. 11 depicts an aspect of certain aspects described with respect to FIG. 3. In particular, a system 1100 that facilitates equalization of received signals utilizing interpolation of equalizer matrices is illustrated. Module 1102 can generate equalizer matrices for a subset of the modulation symbols of a tile using an equalization function. The subset can be selected based upon performance, processing power or any other factor. In addition, the number and particular modulation symbols selected for the subset can vary.

Module 1104 can generate equalizer matrices for the remaining modulation symbols within the tile. In particular, module 1104 can utilize interpolation based upon the equalizer matrices generated by module 1102 to generate the remaining equalizer matrices. Any method for interpolation (e.g., linear, polynomial or spline) can be utilized. Module 1106 can generate equalized modulation symbols for the tile utilizing the equalizer matrices generated by module 1102 and module 1104.

Figure 12:
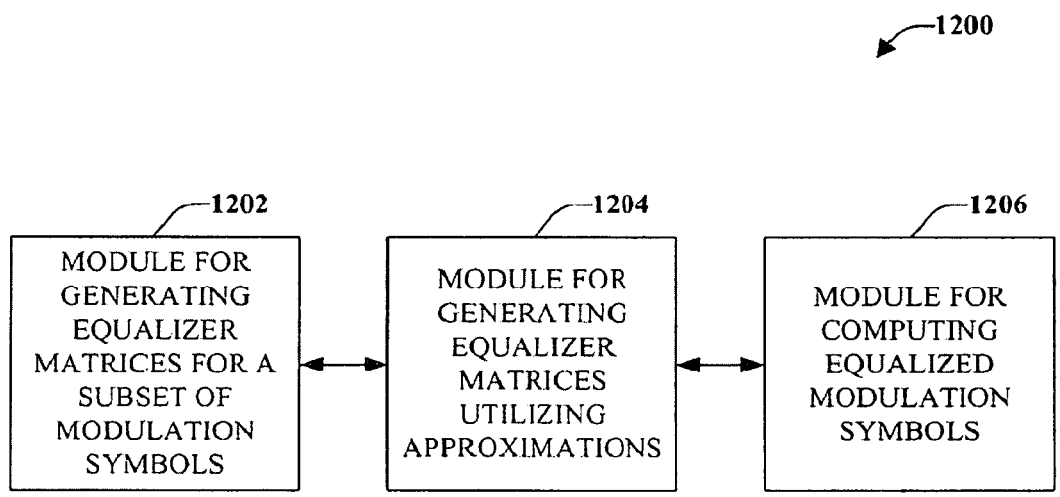
FIG. 12 is an illustration of a system that performs simplified equalization utilizing approximation in accordance with one or more aspects presented herein.

Turning now to FIG. 12, an aspect implementing certain aspects of FIG. 3 is depicted. In particular, a system 1200 that facilitates equalization utilizing simplification of the equalizer function is illustrated. Module 1202 can generate equalizer matrices for a subset of the modulation symbols of a tile using an equalization function. The subset can be selected based upon performance, processing power or any other factor. In addition, the number and particular modulation symbols selected for the subset can vary.

Module 1204 can generate equalizer matrices for the remaining modulation symbols utilizing a simplified version of the equalizer function. In particular, a first order Taylor approximation can be computed in place of a matrix inversion. The computations required for a Taylor approximation are typically less complex than an inverse operation, simplifying processing. Module 1206 can generate equalized modulation symbols for the tile utilizing the equalizer matrices generated by module 1202 and module 1204.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates equalization in a receiver chain, comprising:
    selecting, with a symbol selector component executing on a processor, a subset of a set of modulation symbols based at least in part upon available processing power, wherein more available processing power results in a selection of a larger number of modulation symbols in the subset;
    generating, with an equalizer function component executing on the processor, an equalizer matrix for each element of the subset of the set of modulation symbols, wherein channel estimates associated with the set of modulation symbols are correlated;
    generating, with an interpolation component executing on the processor, an interpolated equalizer matrix for each element of the set of modulation symbols not included in the subset utilizing interpolation of the equalizer matrices;
    equalizing, with an equalization component executing on the processor, the subset of modulation symbols as a function of the equalizer matrices; and
    equalizing, with the equalization component executing on the processor, the modulation symbols not included in the subset as a function of the interpolated equalizer matrices.

2. The method of claim 1, wherein the subset is distributed evenly across the set of modulation symbols.

3. The method of claim 1, further comprising obtaining, with a processor, the channel estimates for the set of modulation symbols, the equalizer matrix and interpolated equalizer matrix are a function of the channel estimates.

4. The method of claim 1, wherein the interpolated equalizer matrices are generated using linear interpolation.

5. The method of claim 1, wherein the interpolated equalizer matrices are generated using polynomial interpolation.

6. The method of claim 1, wherein the interpolated equalizer matrices are generated using spline interpolation.

7. The method of claim 1, further comprising receiving, with a processor, the set of modulation symbols from a plurality of transmit antennas.

8. An apparatus that facilitates equalization, comprising:
    a symbol selector component executing on a processor configured to execute instructions for selecting a subset of a set of modulation symbols based at least in part upon available processing power, wherein more available processing power results in a selection of a larger number of modulation symbols in the subset;
    an equalizer function component executing on the processor configured to execute instructions for computing an equalizer matrix for the first modulation symbol;
    an interpolation component executing on the processor configured to execute instructions for computing an interpolated equalizer matrix for each element of the set of modulation symbols not included in the subset based at least in part upon interpolation from the first equalizer matrix; and
    an equalizer component executing on the processor configured to execute instructions for computing equalized modulation symbols for the subset of the set of modulation symbols utilizing the equalizer matrix and configured to execute instructions for computing equalized modulation symbols for each element of the set of modulation symbols not included in the subset utilizing the interpolated equalizer matrix.

9. The apparatus of claim 8, wherein the interpolation includes at least one of linear interpolation, polynomial interpolation, or spline interpolation.

10. The apparatus of claim 8, wherein the processor is further configured to execute instructions for obtaining channel estimates and interference estimates for the set of modulation symbols.

11. The apparatus of claim 8, wherein the modulation symbols are transmitted by at least two transmit antennas.

12. An apparatus that facilitates equalization, comprising:
    means for determining a subset of a set of modulation symbols based at least in part upon available processing power, wherein more available processing power results in a determination of a larger number of modulation symbols in the subset;

means for generating equalizer matrices for the subset of the set of modulation symbols based at least in part upon an equalizer function, wherein channels associated with the set of modulation symbols are correlated;

means for generating matrices for modulation symbols not included within the subset using interpolation;

means for computing equalized modulation symbols corresponding to the subset of modulation symbols utilizing the equalizer matrices; and means for computing equalized modulation symbols corresponding to the modulation symbols not in the subset utilizing the interpolated matrices.

13. The apparatus of claim 12, wherein interpolation is performed using at least one of linear interpolation, polynomial interpolation or spline interpolation.

14. The apparatus of claim 12, wherein the set of modulation symbols is received from a plurality of transmitting antennas.

15. A non-transitory computer-readable medium having instructions for causing a processor to perform equalization, the instructions comprising:

instructions for causing a symbol selector component executing on the processor to select a subset of a set of modulation symbols based at least in part upon available processing power, wherein more available processing power results in a selection of a larger number of modulation symbols in the subset;

instructions for causing an equalizer function component executing on the processor to calculate equalizer matrices for the subset of the set of modulation symbols based at least in part upon an equalizer function, wherein channels associated with the set of modulation symbols are correlated;

instructions for causing an interpolation component executing on the processor to calculate interpolated matrices for modulation symbols not included within the subset based upon interpolation of the equalizer matrices;

instructions for causing an equalizer component executing on the processor to equalize the subset of modulation symbols as a function of the equalizer matrices; and instructions for causing the equalizer component executing on the processor to equalize modulation symbols not included in the subset as a function of the interpolated matrices.

16. The non-transitory computer-readable medium of claim 15, wherein the interpolation includes at least one of linear interpolation, polynomial interpolation, or spline interpolation.

17. A method that facilitates equalization in a receiver chain, comprising:

generating, with an inverse computation component executing on a processor, an equalizer matrix for each element of a subset of a set of modulation symbols based upon an equalization function;

generating, with an approximation component executing on the processor, a simplified equalizer matrix for each element of the set of modulation symbols not included in the subset utilizing an approximation for an inverse operation of the equalization function, wherein the approximation is a first order Taylor approximation;

equalizing, with an equalization component executing on the processor, each element of the subset of modulation symbols as a function of the equalizer matrices; and equalizing, with the equalization component executing on the processor, each element of the set of modulation symbols not included in the subset as a function of the simplified equalizer matrices.

18. The method of claim 17, further comprising selecting, with a seed selector component executing on the processor, the subset.

19. The method of claim 18, wherein the subset is selected based upon processing power.

20. An apparatus that facilitates equalization, comprising:

an inverse computation component executing on a processor configured to execute instructions for computing an equalizer matrix for a first modulation symbol based at least in part upon an equalizer function;

an approximation component executing on the processor configured to compute a simplified equalizer matrix for a second modulation symbol based at least in part upon a simplification of the equalizer function utilizing an approximation, wherein the approximation is a first order Taylor approximation; and an equalization component executing on the processor configured to equalize the first modulation symbol utilizing the equalizer matrix and configured to equalize the second modulation symbol utilizing the simplified equalizer matrix.

21. The apparatus of claim 20, wherein a seed selector component executing on the processor is further configured to select the first modulation symbol.

22. The apparatus of claim 21, wherein the first modulation symbol is selected based upon processing power.

23. An apparatus that facilitates equalization, comprising:

means for generating equalizer matrices for a subset of modulation symbols based at least in part upon an equalizer function;

means for generating simplified matrices for modulation symbols not included in the subset using a version of the equalizer function, the version utilizing an approximation for an inverse operation of the equalizer function, wherein the approximation is a first order Taylor approximation;

means for computing a set of equalized modulation symbols for each modulation symbol in the subset utilizing the equalizer matrices; and means for computing a set of equalized modulation symbols for modulation symbols not included in the subset utilizing the simplified matrices.

24. The apparatus of claim 23, further comprising means for selecting the subset.

25. A non-transitory computer-readable medium having instructions for causing a processor to perform equalization, the instructions comprising:

instructions for causing an inverse computation component executing on the processor to calculate equalizer matrices for a subset of a set of modulation symbols based at least in part upon an equalizer function;

instructions for causing an approximation component executing on the processor to calculate simplified matrices for modulation symbols not included within the subset based upon an approximation of an inverse operation of the equalizer function, wherein the approximation is a first order Taylor approximation;

instructions for causing an inverse computation component executing on the processor to equalize the subset of modulation symbols as a function of the equalizer matrices; and instructions for causing the inverse computation component executing on the processor to equalize modulation symbols not included in the subset as a function of the simplified matrices.

26. The non-transitory computer-readable medium of claim 23, further comprising instructions for causing a seed selector component executing on the processor to perform selecting the subset.

* * * * *